Dec. 29, 1953   S. M. VIALE   2,664,151
CONTROL MEANS FOR FUEL SYSTEMS OF GAS TURBINE ENGINES
Filed May 11, 1948
2 Sheets-Sheet 2
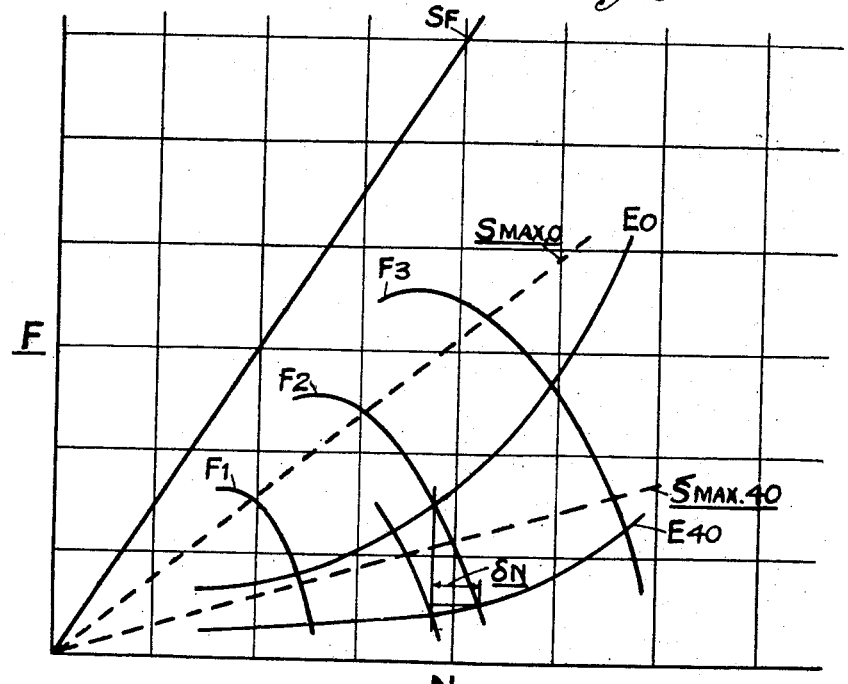
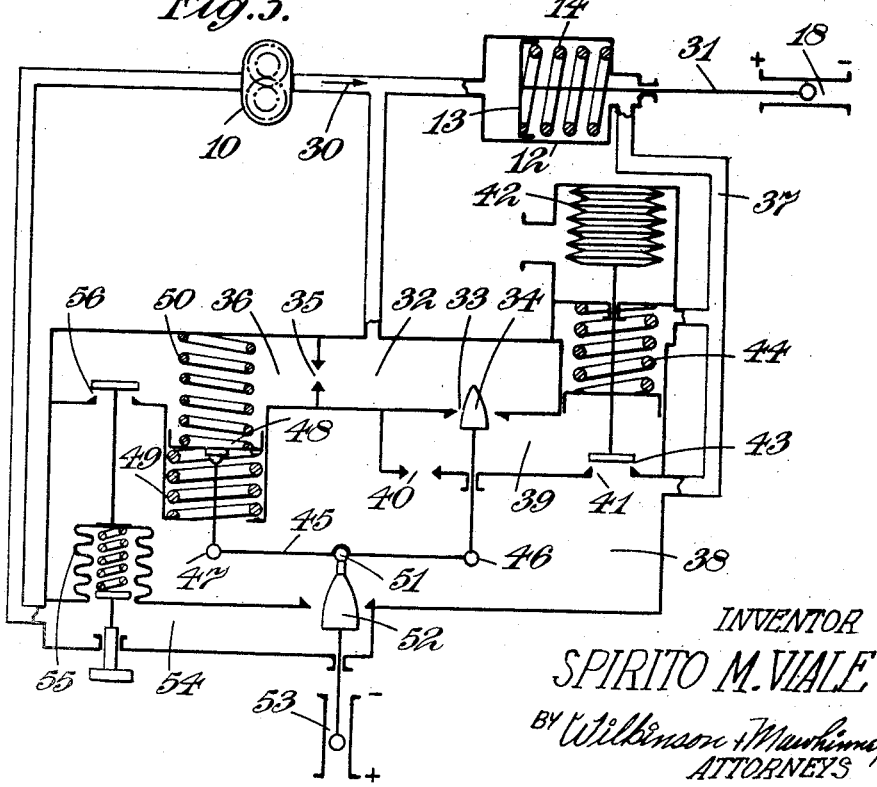
INVENTOR
SPIRITO M. VIALE
BY Wilkinson + Mawhinney
ATTORNEYS Patented Dec. 29, 1953

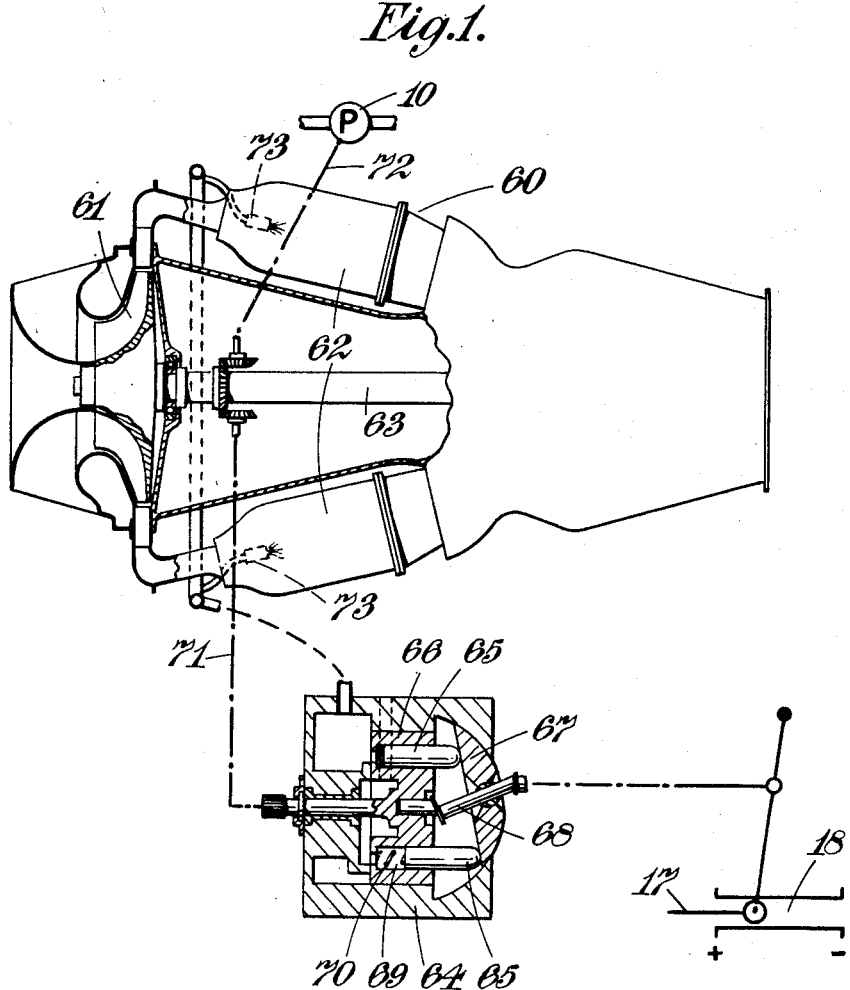

2,664,151

UNITED STATES PATENT OFFICE 2,664,151

CONTROL MEANS FOR FUEL SYSTEMS OF GAS TURBINE ENGINES

Spirito Mario Viale, Coventry, England, assignor to Rolls-Royce Limited, Derby, England, a British company Application May 11, 1948, Serial No. 26,422

Claims priority, application Great Britain May 12, 1947

8 Claims. (Cl. 158—36.4)

This invention relates to control means for fuel systems of gas-turbine engines. The invention is particularly concerned with control means for such fuel systems where a comparatively wide range of speed and fuel supply is to be catered for. For instance the control means of a fuel system of a gas-turbine engine used for jet propulsion should enable stability of engine speed to be maintained throughout the full range of engine speeds from idling speed to maximum speed, and additionally should enable the correct rotational speed in accordance with the pilot's speed control setting to be maintained throughout the operational range of altitude of the aircraft.

The present invention has for an object to provide a control means for a fuel system of a gas-turbine engine giving stability of control throughout its operational range.

According to the present invention there is provided in a gas-turbine engine a fuel system arranged for governing the speed of the engine to a desired value by variation of the fuel supply and comprising a variable-stroke fuel pump having means to adjust the fuel-pump stroke, control means comprising a hydraulic positive-displacement fixed-capacity pump, a driving connection between the engine and the fixed-capacity pump to drive the fixed-capacity pump at a speed proportional to the engine speed, a hydraulic circuit connected between the inlet and delivery of the fixed-capacity pump and comprising restrictive orifice means arranged to pass the full delivery of the fixed-capacity pump thereby to produce a pressure drop which is a function of the engine rotational speed, an adjustable member co-operating with the orifice means to select the effective area of the orifice means, a manual setting member and interconnecting the manual setting member and said adjustable member a servo mechanism effective to increase the rate of response of the control means to changes of engine rotational speed, a pressure-responsive device having a displaceable element, hydraulic connections from said pressure responsive device to the hydraulic circuit on each side of the orifice means to load the displaceable element by said pressure drop, a spring of substantially constant rate to load said displaceable element in opposition to the load due to the pressure drop, and an operative connection from the displaceable element to the means to adjust the fuel pump stroke arranged to decrease the pump stroke with increase in the pressure drop.

One arrangement of control means of this invention will now be described by way of example, reference being made to the accompanying diagrammatic drawings in which:

Figure 1 illustrates diagrammatically a gas-turbine engine and a fuel pump therefor and the driving connection between the gas-turbine engine and the fuel pump, Figure 2 illustrates graphically the functioning of the control of this invention, and Figure 3 illustrates a form of the control means.

The embodiments described are suitable for application to controlling the fuel supply to an aircraft jet-propulsion gas-turbine engine 60 (Figure 1), which normally comprises a compressor 61 delivering air to combustion equipment 62 in which liquid fuel is burnt, and a turbine (not shown) through which the products of combustion pass, and by which the compressor is driven through shaft 63. The exhaust from the turbine is directed rearwardly to propel the aircraft.

Figure 2 illustrates graphically, for such an engine, the fuel consumption F for differing engine rotational speeds N, the curves $E_0$ and $E_{40}$ representing respectively the consumptions at ground level and at altitude (say, 40,000 ft.). Corresponding curves can be produced for the fuel consumption at intermediate altitudes and these curves will lie between the curves $E_0$ and $E_{40}$.

The engine fuel pump 64, i. e. pump supplying liquid fuel to fuel injection means or burners 73 in the combustion equipment, is of the variable delivery kind, being for example as illustrated in Figure 1, a multi-plunger pump having a plurality of plungers 65 in a rotor 66, and having means such as swash plate 67 and cranked spindle 68 for varying stroke of the plungers 65 which reciprocate in bore 69 in the rotor 66 against the action of springs 70; the pump is driven at a speed proportional to the rotational speed of the engine as through drive shaft 71, and thus the delivery of the pump on full stroke can be represented by a line $S_f$, i. e. $F = S_f N$. The stroke of the pump is varied by moving the cranked spindle axially of itself so that the swash plate occupies different positions along the length of the cranked portion of the spindle. The construction of such fuel pumps is well known.

The invention provides control means for varying the pump stroke, so that the pump stroke at any instant is given by the relation $$S_c = S_f - \frac{N^2}{C_s}$$

where $C_s$ is a factor of selected value dependent on the desired engine speed. The value of the factor is determined by the effective area of the orifice which is controlled by the valve element 52. Referring now to Figure 2, the curves generally indicated by references $F_1$, $F_2$ and $F_3$ illustrate typical fuel flow/rotational speed curves for three selected values of $C_s$. The control means to be described operates in such manner that for a value of $C_s$ corresponding for example to curve $F_2$, the rotational speed of the engine under ground level conditions is stabilised at a speed corresponding to the point at which the curve $F_2$ intersects the fuel consumption curve $E_0$. In accelerating the engine, from low speed, by selection for example of a value of $C_s$ corresponding to curve $F_2$ the fuel pump will operate at the maximum stroke to supply fuel in accordance with the fuel delivery line $S_{max.0}$ until it reaches a value corresponding to the point at which the line $S_{max.0}$ is intersected by curve $F_2$, after which the pump stroke and fuel supply will be decreased until the supply corresponds to the point of intersection of curves $F_2$ and $E_0$. The control is also arranged to avoid increase of speed, for example as indicated by $\delta N$ in Figure 2, by providing barometric means which have the effect of gradually displacing the curve $F_2$ to the left so that the locus of the point of intersection of the fuel delivery curve $F_2$ with the engine consumption curves E is a line parallel to the ordinate of the graph. The curve $F_2'$ illustrates the position of the curve $F_2$ at the altitude corresponding to the consumption curve $E_{40}$. With the control of this invention, the fuel flow at any instant is given by $$F = S_f N - \frac{N_3}{C_s}$$

Turning now to Figure 3 there is illustrated control means in which the effective value of $C_s$ is varied by changing the effective area of the orifice in the hydraulic pump circulating system. The hydraulic pump driven at a speed directly proportional to engine speed is shown at 10 and delivers a liquid around the hydraulic circuit in the direction indicated by the arrow 30. Delivery pressure of the pump operates on piston 13 which slides in cylinder 12 and is spring loaded by coil spring 14. Movement of the piston 13 is transmitted directly through connecting rod 31 to pump stroke controlling means 18, the sense of stroke change again being illustrated by the symbols + and −. The liquid flows from the pump 10 to a chamber 32 having an outlet in the form of an orifice 33 the effective area of which is controlled by a valve element 34. In addition there is provided a fixed restrictive orifice 35 communicating with chamber 36.

The spring-loaded side of the piston 13 communicates via passage 37 with a chamber 38, and the liquid flowing through the variable orifice 33 enters a chamber 39 and then flows into chamber 38 through orifice means 40 and 41. The function of the orifice means 40 and 41 is to ensure that a minimum pressure exists across the piston 13, thus determining the maximum stroke of the fuel-pump—since the stroke of the fuel pump increases with decrease in pressure drop across the piston. The orifice 40 is a fixed orifice and orifice 41 is controlled by a valve 43 which is loaded by means of a barometric capsule 42 subjected to atmospheric pressure (or a pressure which is a function of barometric pressure), such that the loading on a valve element 43 is increased with increase of altitude, and also by means of a spring 44, so that effectively the spring load is increased by the capsule 42 with increase of altitude. Thus the minimum permissible pressure drop across the piston 13 increases with altitude, so that the maximum possible stroke setting of the pump decreases with altitude. Referring to Figure 2 such stroke setting lines are indicated at $S_{max.0}$ and $S_{max.40}$, i. e. maximum stroke lines corresponding with altitude 0 ft. and altitude 40,000 ft.

The power lever control can be arranged to operate directly on the valve element 34. However in the embodiment illustrated to improve stability of control, and to ensure that the rotational speed of the engine does not vary with altitude, the valve 34 is operated by means of a servo system, which includes a beam 45 pivoted at 46 to the stem of the valve element 34 and at 47 to the connecting rod of a piston 48. This piston is urged into a central position by springs 49 and 50, and is subjected to a pressure drop existing between chambers 36 and 38. In addition the beam 45 is pivoted at 51 to a valve member 52; the position of which is set by a speed selecting lever generally designated at 53, where increase and decrease of speed respectively are shown by the symbols + and −. The valve element 52 controls the passage of liquid through a setting orifice to a chamber 54, representing the suction side of the pump 10. In addition, there is provided a spring loaded capsule 55 which is subjected differentially to pressures in chambers 38 and 54, and is arranged to actuate a valve 56 controlling flow between chambers 36 and 38, the chamber 36 being supplied with liquid through the fixed orifice 35.

The valve 56 in effect provides a servo action on the movement of the valve element 34, and the operation is as follows: Assume that the valve 52 is set to select a desired rotational speed. An unwanted increase of engine speed will result in increased delivery by the pump 10, causing an increase of pressure throughout the system. As a result of this increase in pressure, the piston 13 tends to decrease the fuel pump stroke, and the pressure increase in chamber 38 causes compression of the capsule 55 closing the valve 56 and increasing the pressure acting through the servo piston 48 against spring 49. The piston 48 is thereby displaced causing pivoting of the beam 45 to close the valve 34. This closure intensifies the pressure rise operating on piston 13 causing more rapid return to the selected rotational speed.

Considering a selected change of speed, e. g. acceleration, the speed selecting control 53 opens the valve 52 selecting the new setting of the setting orifice and an immediate decrease in pressure within the chamber 38 occurs; this results in expansion of the capsule 55 opening the valve 56 causing an overall reduction in pressure differential as between chambers 36 and 38 and permitting the piston 48 to rise, which movement operating through the beam 45 causes accentuated opening of the valve 34, resulting in rapid reduction of pressure operating on the piston 13, which under the influence of the spring 14 moves to the maximum permissible stroke setting determined by the minimum pressure drop through the orifices 40 and 41. The pump stroke is then controlled by the system so that the delivery follows the maximum delivery curve until the appropriate curve F is reached when the stroke is reduced to the value appropriate for the selected engine speed.

In the system outlined above it will be appreciated that valve 52 gives a basic speed selection by the setting of lever 53; the delivery of the pump 10 passes through the orifice controlled by this valve 52, and there will be a series of curves connecting pressure drop through this orifice with engine rotational speed and these curves will be independent of altitude, each curve being correlated with a preselected setting of the valve 52.

An additional function of the capsule 55 is as follows: Assume a fixed position of valve 52, and the altitude of the aircraft to increase: as previously explained such increase of altitude results in reduction of fuel consumption, which corresponds to reduction of fuel pump stroke, which in a system including a single variable orifice such as 33 would result in the increment of increase of speed $\delta N$ (Figure 2). However the capsule 55 is sensitive to increase of pressure in chamber 38 which results from such increase of speed, and the valve 56 is thereby moved to increase the restriction of flow as between chambers 36 and 38, causing an increased pressure drop between these chambers, depressing the piston 48 to reduce, through the beam 45 and valve 34, the size of the orifice 33. The function of the capsule 55 and valve 56 in combination with the variable restriction 52 is therefore to maintain substantially constant engine rotational speed independently of altitude.

I claim:

1. In a gas-turbine fuel system arranged for governing the speed of the engine to a desired value by variation of the fuel supply and comprising a variable-stroke fuel pump having means to adjust the fuel-pump stroke, control means comprising a hydraulic positive-displacement fixed-capacity pump, a driving connection between the engine and the fixed-capacity pump to drive the fixed-capacity pump at a speed proportional to the engine speed, a hydraulic circuit connected between the inlet and delivery of the fixed-capacity pump and comprising orifice means arranged to pass the full delivery of the fixed-capacity pump thereby to produce a pressure drop which is a function of the engine rotational speed, said orifice means comprising a first orifice, and in series with said first orifice a fixed area orifice and a hydraulically-parallel-arranged adjustable-area orifice, an adjustable member co-operating with said first orifice to select the effective area thereof, a barometric device responsive to a barometric pressure, a valve member adjustable by said barometric device and co-operating with said adjustable-area orifice to increase the effective restriction of said adjustable-area orifice on decrease in said barometric pressure, a pressure-responsive device having a displaceable element, hydraulic connections from said pressure responsive device to the hydraulic circuit on each side of the orifice means to load the displaceable element by said pressure drop, a spring of substantially constant rate to load said displaceable element in opposition to the load due to the pressure drop, and an operative connection from the displaceable element to the means to adjust the fuel pump stroke arranged to decrease the pump stroke with increase in the pressure drop.

2. In a gas-turbine fuel system arranged for governing the speed of the engine to a desired value by variation of the fuel supply and comprising a variable-stroke fuel pump having means to adjust the fuel-pump stroke, control means comprising a hydraulic positive-displacement fixed-capacity pump, a driving connection between the engine and the fixed-capacity pump to drive the fixed-capacity pump at a speed proportional to the engine speed, a hydraulic circuit connected between the inlet and delivery of the fixed-capacity pump and comprising restrictive orifice means arranged to pass the full delivery of the fixed-capacity pump thereby to produce a pressure drop which is a function of the engine rotational speed, an adjustable member co-operating with the orifice means to select the effective area of the orifice means, a manual setting member and interconnecting the manual setting member and said adjustable member a servo mechanism effective to increase the rate of response of the control means to changes of engine rotational speed, a pressure-responsive device having a displaceable element, hydraulic connections from said pressure responsive device to the hydraulic circuit on each side of the orifice means to load the displaceable element by said pressure drop, a spring of substantially constant rate to load said displaceable element in opposition to the load due to the pressure drop, and an operative connection from the displaceable element to the means to adjust the fuel pump stroke arranged to decrease the pump stroke with increase in the pressure drop.

3. In a gas-turbine fuel system arranged for governing the speed of the engine to a desired value by variation of the fuel supply and comprising a variable-stroke fuel pump having means to adjust the fuel-pump stroke, control means comprising a hydraulic positive-displacement fixed-capacity pump, a driving connection between the engine and the fixed-capacity pump to drive the fixed-capacity pump at a speed proportional to the engine speed, a hydraulic circuit connected between the inlet and delivery of the fixed-capacity pump and comprising orifice means arranged to pass the full delivery of the fixed capacity pump thereby to produce a pressure drop which is a function of the engine rotationed speed, an adjustable member co-operating with the orifice means to select the effective area of the orifice means, a pressure-responsive device having a displaceable element, hydraulic connections from said pressure responsive device to the hydraulic circuit on each side of the orifice means to load the displaceable element by said pressure drop, a spring of substantially constant rate to load said displaceable element in opposition to the load due to the pressure drop, an operative connection from the displaceable element to the means to adjust the fuel pump stroke arranged to decrease the pump stroke with increase in the pressure drop, a setting orifice in said hydraulic circuit downstream of the said hydraulic connections, a manually-adjustable valve element to select the effective area of said setting orifice, means responsive to the pressure drop across said setting orifice, and servo means interconnecting said adjustable member and said manually-adjustable valve element, which servo means is controlled by the means responsive to the setting orifice pressure drop to increase the rate of response of the control means to changes in engine speed.

4. Control means as claimed in claim 3, wherein the servo means comprises a chamber connected with the hydraulic circuit upstream of the orifice means through a fixed restriction, a second chamber connected with the hydraulic circuit between the orifice means and the setting orifice, a valve controlling flow of liquid between said chambers, said valve being connected with the means responsive to the pressure drop across the setting orifice to be adjusted thereby, a spring-biased piston member subjected at its opposite ends respectively to the pressures in said chambers, and a floating beam connected at its ends respectively to the said piston and the adjustable member of the orifice means and pivoted to the manually-adjustable valve element.

5. Control means as claimed in claim 4, wherein the means responsive to the pressure drop across the setting orifice comprises an expansible capsule having one side arranged in communication with the said second chamber and the other side arranged in communication with said hydraulic circuit downstream of the setting orifice.

6. Control means as claimed in claim 5, wherein the orifice means comprises a first orifice with which said adjustable member co-operates and flow-restricting means connected hydraulically in series with the first orifice to determine a minimum value for the pressure drop applied to the displaceable element.

7. Control means as claimed in claim 6, comprising a device responsive to a barometric pressure and the flow-restricting means comprises a valve member adjustable by the barometric pressure responsive device to increase the effective restriction of the flow restricting means on decrease in the barometric pressure.

8. Control means as claimed in claim 7, wherein the flow restricting means comprises a fixed area orifice and hydraulically in parallel therewith an orifice the effective area of which is adjusted by said valve member.

S. M. VIALE.

References Cited in the file of this patent

UNITED STATES PATENTS

| Number | Name | Date |
|---|---|---|
| 1,347,276 | Johnson | July 20, 1920 |
| 1,760,421 | Luthi | May 27, 1930 |
| 2,002,040 | Mock | May 21, 1935 |
| 2,219,994 | Jung | Oct. 29, 1940 |
| 2,369,397 | Kostenick | Feb. 13, 1945 |
| 2,384,282 | Chandler | Sept. 4, 1945 |
| 2,424,035 | Ifield | July 15, 1947 |
| 2,445,113 | Green | July 13, 1948 |
| 2,481,334 | Nicholls | Sept. 6, 1949 |

FOREIGN PATENTS

| Number | Country | Date |
|---|---|---|
| 403,476 | Great Britain | Dec. 28, 1933 |
| 490,978 | Great Britain | Aug. 24, 1938 |